United States Patent [19]
Burberry et al.

[11] 3,735,793
[45] May 29, 1973

[54] PLATE EVAPORATORS

[75] Inventors: Robin Keith Burberry, Copthorne; Robert Anthony White, Banstead, both of England

[73] Assignee: The A.P.V Company Limited, Crawley, Sussex, England

[22] Filed: May 4, 1971

[21] Appl. No.: 140,058

[52] U.S. Cl. ............ 159/28 P, 15/167, 202/236, 202/172, 159/13, 159/2
[51] Int. Cl. ...... B01d 1/00, B01d 3/02, F28f 3/08, B01d 3/28, B01d 1/22, B01d 1/28
[58] Field of Search ............ 159/28 P, 2, 13; 165/166, 7; 202/172, 236

[56] References Cited

UNITED STATES PATENTS

| | | | |
|---|---|---|---|
| 2,562,739 | 7/1951 | Risberg | 159/28 P X |
| 2,960,160 | 11/1960 | Goodman | 159/28 P X |
| 3,155,565 | 11/1964 | Goodman | 159/28 P X |

Primary Examiner—Norman Yudkoff
Assistant Examiner—J. Sofer
Attorney—Christel & Bean

[57] ABSTRACT

A plate type evaporator of the falling film type, comprising a pack of plates arranged in spaced face-to-face relationship and gasketed to define flow spaces for heating medium and feed liquid between the plates, characterized in that distribution means is provided to distribute the feed liquid across the flow spaces, the said distribution means comprising at least one restriction leading to a transversely extending distribution zone in communication with one or more flow spaces, the restriction being adapted to cause some flashing of vapor from the feed liquid whereby a mixture of liquid and vapor is present in the distribution zone, the or each distribution zone communicating with the respective flow spaces through a series of laterally spaced further restrictions which are adapted to produce further flashing as the liquid and vapor mixture passes through them.

8 Claims, 8 Drawing Figures

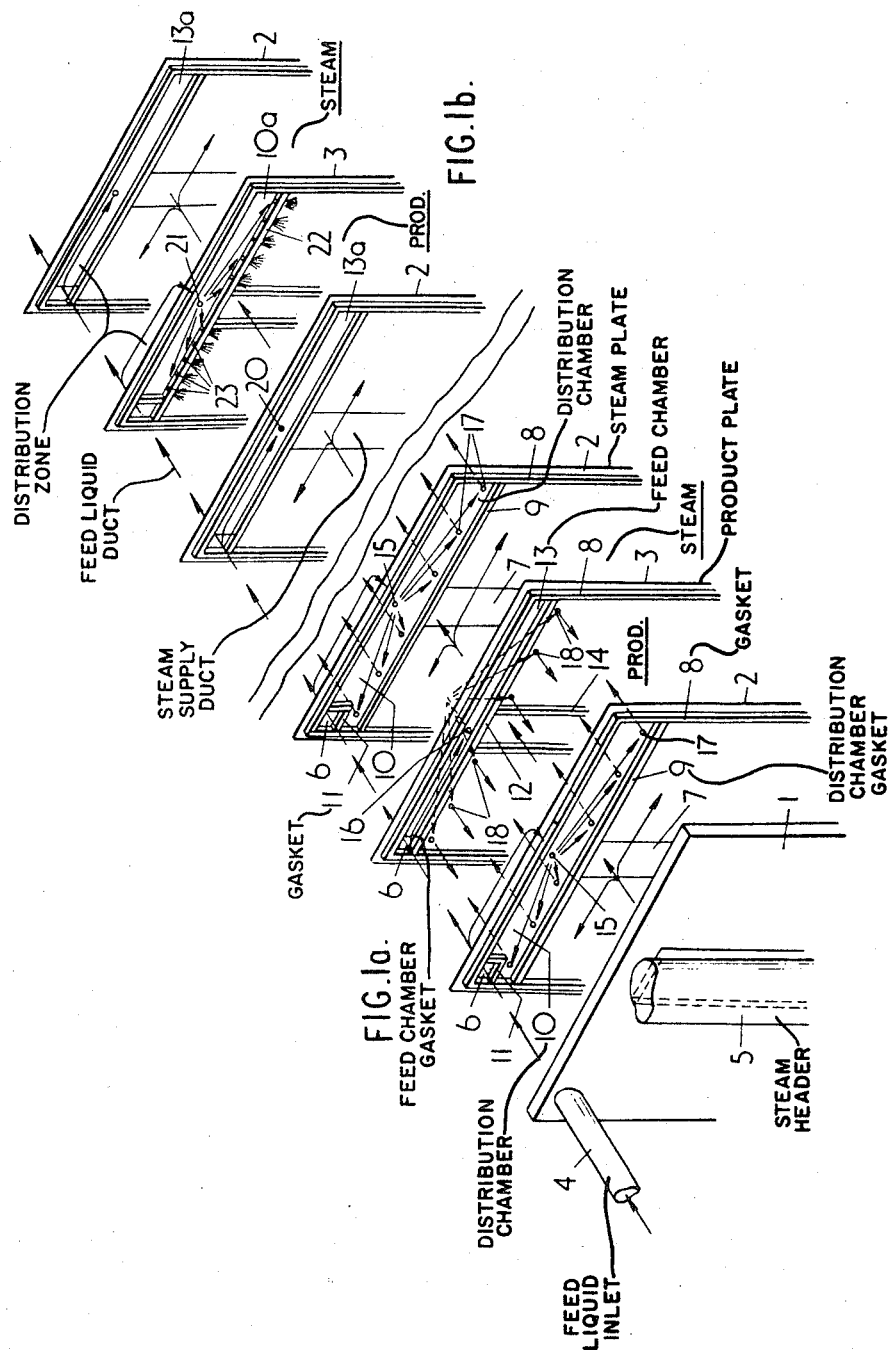

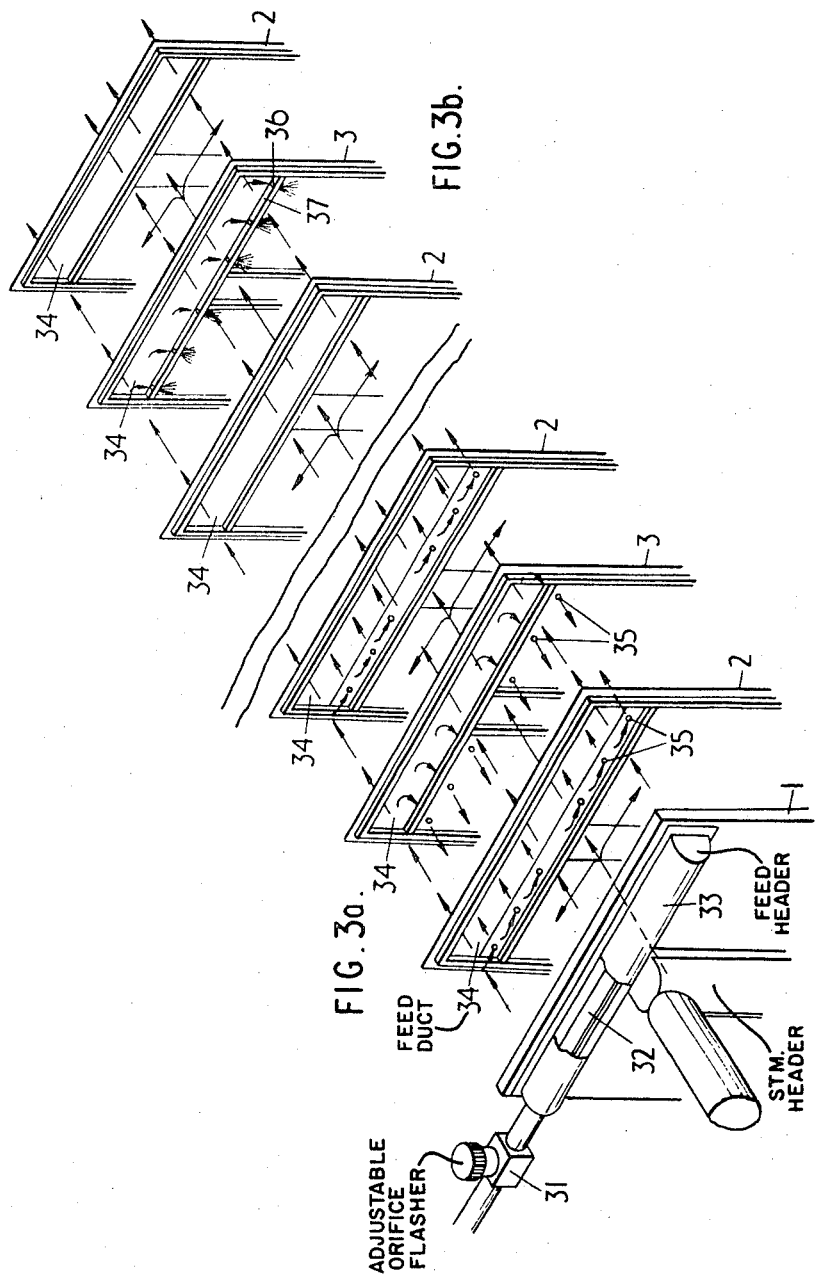

PLATE EVAPORATORS

This invention relates to evaporators, and more particularly to plate-type evaporators incorporating a falling film.

A plate-type evaporator comprises a pack of plates arranged in spaced face-to-face relationship and having peripheral gaskets therebetween to define alternate steam and process fluid flow spaces. An evaporator of either the plate or tubular type in which the liquid being evaporated in descending under gravity is called a falling film evaporator. It has long been known that the falling film type of evaporator offers several advantages over other forms of evaporator. There is no level of liquid formed in the falling film evaporator since there is no rising section, which means that the low heat transfer rate which occurs in this region is eliminated, also this liquid level constitutes an additional pressure loss which in turn reduces the effective temperature difference available for the conduction of heat. Another advantage is that the residence time in the evaporator is reduced if this liquid level is eliminated, and as a consequence the evaporated liquid is not in contact with the hot surface for so long a period and this results in better products where flavor and taste are important.

Thus, briefly the advantages that a falling film evaporator offers are higher heat transfer coefficients; lower residence time; and lower volume of liquid in the evaporator at any given instant.

However, with a falling film plate-type evaporator there is a problem of obtaining distribution of the feed liquid across the width of the plates. If the plates are not covered with an adequate flow of liquid then burning-on will occur, which is detrimental to a large number of liquids, such as food liquids which have their flavor damaged, and also leads to the formation of scale on the plates, which adversely affects their heat transfer characteristics.

The invention consists in a plate-type evaporator of the falling film type, comprising a pack of plates arranged in spaced face-to-face relationship and gasketed to define flow spaces for heating medium and feed liquid between the plates, characterized in that distribution means is provided to distribute the feed liquid across the flow spaces, the said distribution means comprising at least one restriction leading to a transversely extending distribution zone in communication with one or more flow spaces, the restriction being adapted to cause some flashing of vapor from the feed liquid whereby a mixture of liquid and vapor is present in the distribution zone, the distribution zones being connected with the flow spaces through a series of laterally spaced further restrictions which are adapted to produce further flashing as the liquid and vapor mixture passes through them.

There may be a plurality of distribution zones to the pack of plates, or a single such zone.

The restriction leading to the or each distribution zone is primarily a throttling device which builds up a back pressure in the feed line to suppress flashing therein and to cause flashing as the pressure drops on entering the distribution zone.

The relative sizes of the restrictions are chosen to obtain a suitable relationship between the amount of flashing obtained on entry to and exit from the distribution zone.

The presence of flash vapor in the liquid and vapor mixture being fed to the flow spaces has a beneficial effect on the distribution.

The invention will be further described with reference to the accompanying diagrammatic drawings which show various embodiments of the invention.

In the drawings:

FIGS. 1a and 1b show exploded perspective views of the upper parts of a few plates constituting part of a plate-type evaporator, to illustrate two embodiments in the invention;

Figures 4A, 4B:
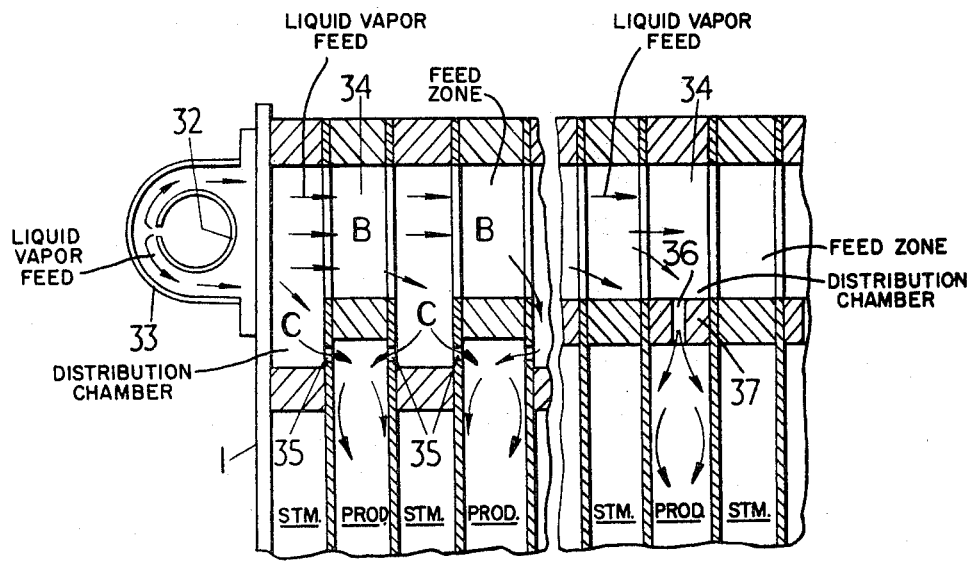

FIGS. 3a and 3b are views similar to FIGS. 1a and 1b showing two further embodiments of the invention; and FIGS. 4a and 4b are sectional views of the structures of FIGS. 3a and 3b respectively.

FIGS. 1a shows the upper part of a head 1 which forms part of a frame, of which the other parts are not shown, mounting a pack of plates of two types labelled 2 and 3 respectively. The head 1 carries an upper feed liquid inlet 4 and a steam header 5 aligned with corresponding apertures 6 and 7 in the plates. The aligned apertures 6 and 7 constitute respectively the feed liquid and steam supply ducts. Condensate and concentrate and vapor discharge ducts are also provided but are not illustrated. The plates 2, termed steam plates, have peripheral gaskets 8, distribution chamber gaskets 9 defining a distribution chamber 10 and a gasket 11 isolating the aperture 6 from the chamber 10. The aperture 7 is not gasketed and steam may therefore flow into the steam flow space defined by the gasket 8 below the gasket 9. The plates 3, termed product plates, have peripheral gaskets 8, feed chamber gaskets 12 isolating a feed chamber 13 from the liquid space, and gaskets 14 isolating the aperture 7 from the liquid flow spaces. The aperture 6 is in communication with the feed chamber 13.

Figures 2A, 2B:
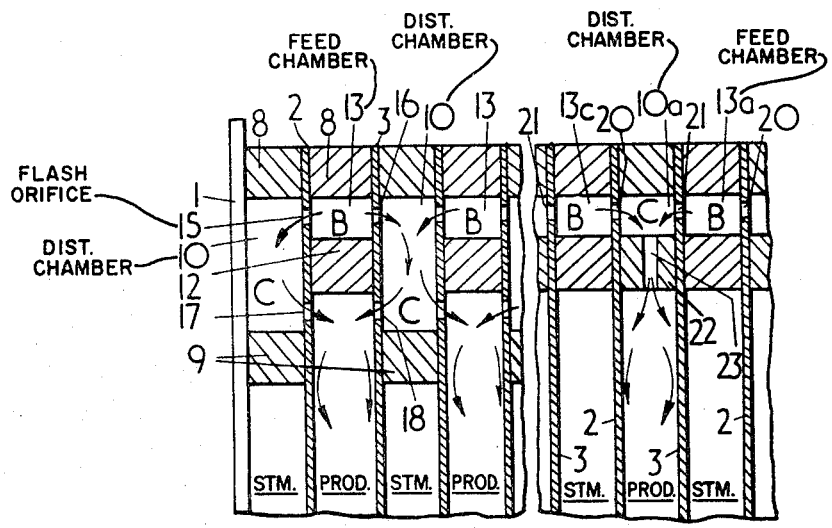
FIGS. 2a and 2b are sectional views of the structure of FIGS. 1a and 1b respectively.

The distribution of the feed liquid from the aligned apertures 6 takes place via the feed chamber 13 (marked B in FIGS. 2a and 2b). A hole 15 in the plate 2 and a hole 16 in the plate 3 provide restricted communication between the feed chamber 13 and the two adjacent distribution chambers 10 (marked C in FIGS. 2a and 2b). These provide a first stage of flashing to form a liquid and vapor mixture in the distribution chamber 10. A series of laterally spaced orifices 17 is provided in each plate 2 and a similar series of orifices 18 is provided in each plate 3. The orifices 17 and 18 provide restricted communication between each of the distribution chambers 10 and the adjacent product flow spaces.

Feed liquid enters through inlet 4 and apertures 6 and passes into the feed chamber 13 at the top of each product plate 3, from where it flashes through holes 15 and 16 into the adjacent distribution chambers 10, situated at the top of each steam plate 2. Hence a vapor/liquid mixture (the ratio between these components being dependent on size of hole, feed rate, feed temperature, boiling temperature) is present in these distributions chambers 10, which mixture subsequently passes through the rows of distribution orifices 17 and 18 in each adjacent plate. More flashing takes place due to the pressure drop through these orifices and the high velocity vapor/liquid mixture issuing from the orifices impinges on the opposing plate surface. The impingement causes the liquid to fan out and run down the surface of the opposite plate. As each plate has a row of distribution orifices 15 and 17 or 16 and 18, the jet impinges on both surfaces of the product flow space. The holes on each side of the flow space are in the same horizontal plane but laterally offset so that little interference occurs between jets from opposite sides of the product flow space.

FIGS. 1b and 2b show a similar type of two-stage flashing distribution arrangement. The feed chamber 13a is located at the top of the steam flow space defined by the gaskets on the steam plate 2. The distribution chamber 10a is located at the top of product plate 3. The feed liquid is fed and flashed through holes 20 and 21 from the feed chamber 13a to the adjacent distribution chambers 10a which are separated from the product flow spaces by gaskets 22. The gaskets 22 have a series of transversely spaced nozzles 23 set in them to provide restricted communication between the distribution chambers 10a and the corresponding product flow spaces. The spraying effect through the nozzles completes the distribution of the liquid over the surfaces defining the product flow space.

In either of the preceding embodiments the pitch of the orifices 17, 18, and the nozzles 23 can be varied, and the number of orifices or nozzles can be based on a certain maximum pitch for good distribution and determined by the width of the flow space. Hence these systems are completely independent of the plate width.

FIGS. 3a and 4a show an embodiment in which the feed liquid is fed via an adjustable orifice 31 in a conduit 32 to a feed header 33 on the head 1. A feed duct 34 extends along the top of the pack of plates, being defined by gasketed apertures in them. A row of orifices 35 is provided in each plate for restricted communication between the feed duct 34, which carries a liquid and vapor mixture, and the product flow spaces.

FIGS. 3b and 4b show an embodiment in which the orifices are replaced by nozzles 36 spaced across the plates and set in a gasket 37.

It will be seen that these arrangements differ from those of FIGS. 1a, 2a, and 1b, 2b, in that instead of flashing through individual plate holes and into separate distribution chambers for each unit, flashing takes place across a single orifice 31 prior to the plate pack, and the mixture enters a continuous flash chamber (duct 34), above the plate pack, formed by a rectangular opening in the top of each plate.

The continuous duct 34 has to be of such a cross section that the maximum velocity is low in order to prevent excessive pressure losses down the length of the pack.

Various modifications may be made within the scope of the invention.

We claim:

1. In a plate evaporator of the falling film type, comprising a pack of vertical plates in spaced face-to-face relationship with gaskets interposed therebetween defining alternating flow spaces for heating medium and feed liquid between adjacent plates, an upper feed liquid supply duct, and distribution means for distributing the feed liquid from the supply duct across the upper portions of the feed liquid flow spaces: the improvement that the distribution means for each feed liquid flow space comprises a transversely extending distribution zone having a feed chamber and a distribution chamber; at least one restriction forming part of a flow path between the feed liquid supply duct and the distribution chamber and being adapted to cause a pressure drop in the feed liquid and some flashing of vapors from the feed liquid, whereby a mixture of liquid and vapor is present in the distribution chamber, and a series of laterally spaced further restrictions allowing communication between the distribution chamber and one of the feed liquid flow spaces, said last mentioned restriction being adapted to produce further flashing as the mixture of liquid and vapor passes from the distribution chamber through them.

2. A plate evaporator as claimed in claim 1, wherein the feed liquid duct feeds all of the feed liquid flow spaces via the distribution zones and their feed distribution chambers.

3. A plate evaporator as claimed in claim 1, characterized in that the said further restrictions are formed by orifices in the plates.

4. A plate evaporator as claimed in claim 1, characterized in that the said further restrictions are formed by nozzles set in the gaskets separating the distribution chamber from the flow spaces.

5. A plate evaporator as claimed in claim 1, wherein each of the distribution chambers feeds at least one of the feed liquid flow spaces.

6. A plate evaporator as claimed in claim 5, in that the said further restrictions are formed by nozzles set in the gaskets which separate the distribution chambers from the flow spaces for the feed liquid, and in which the feed liquid is fed from the supply duct to feed zones isolated by gaskets from the flow space zones for the heating medium, said feed liquid communicating by orifices in the plates with the distribution zones which are separated by the gaskets with inset nozzles from the flow spaces for the feed liquid.

7. A plate evaporator as claimed in claim 5, characterized in that the series of orifices feeding into flow space zones for the feed liquid are staggered at opposite sides of the distribution zones.

8. A plate evaporator as claimed in claim 7, characterized in that the feed liquid is fed from a feed duct to feed zones overlying and isolated by gaskets from the heating medium flow spaces, and communicating by orifices in the plates with the distribution zones which are separated by the gaskets with inset nozzles from the flow spaces for the feed liquid.

* * * * *